United States Patent [19]

Fennema et al.

[11] Patent Number: 5,425,013
[45] Date of Patent: Jun. 13, 1995

[54] RELATIVE POSITION SENSING CALIBRATION FOR OPTICAL STORAGE DEVICE

[75] Inventors: Alan A. Fennema; Timothy S. Gardner; Brian G. Goodman, all of Tucson, Ariz.; Yoshihiro Hirasaka, Sagamihara, Japan

[73] Assignee: International Business Machines Corporation, Armonk, N.Y.

[21] Appl. No.: 151,238

[22] Filed: Nov. 12, 1993

[51] Int. Cl.⁶ .................................................. G11B 7/00
[52] U.S. Cl. ............................. 369/44.35; 369/44.25; 369/44.27; 369/44.29
[58] Field of Search .................... 369/32, 44.25, 44.27, 369/44.28, 44.29, 44.32, 48, 54, 58, 44.35, 44.36

[56] References Cited

U.S. PATENT DOCUMENTS

| | | | |
|---|---|---|---|
| 5,220,546 | 6/1993 | Fennema | 369/32 |
| 5,251,194 | 10/1993 | Yoshimoto et al. | 369/44.29 |
| 5,347,501 | 9/1994 | Iimura | 369/44.25 |
| 5,347,503 | 9/1994 | Koyama et al. | 369/44.32 |

*Primary Examiner*—Georgia Y. Epps
*Assistant Examiner*—Nabil Hindi
*Attorney, Agent, or Firm*—D. A. Shifrin

[57] ABSTRACT

A relative position error signal is calibrated in an optical storage device in which a tracking error signal (TES) varies as the light beam shifts its position through the objective lens. The calibration is performed by moving the coarse carriage to a predetermined region of the optical disk and measuring the TES. The fine actuator is adjusted until the tracking error signal equals a predetermined value. Then, the relative position error signal is read and an adjustment to the RPE gain is calculated to bring the gain to a predetermined value. The adjusted gain is used during normal disk access operations.

4 Claims, 3 Drawing Sheets

RELATIVE POSITION SENSING CALIBRATION FOR OPTICAL STORAGE DEVICE

TECHNICAL FIELD OF THE INVENTION

The present invention relates to optical storage devices, and in particular, to calibrating a relative position error signal in such a device.

BACKGROUND OF THE INVENTION

In an optical storage system, data on an optical disk is stored in spiral or concentric tracks. A laser beam is directed through a series of optical elements and focused as a beam spot on a surface of the disk. Typically, a coarse carriage, on which is mounted an objective lens through which the beam passes, is moved along a radial path to enable the beam spot to be moved between the innermost and the outermost track on the disk. The resolution of the coarse carriage and controlling servo loop is generally sufficient to permit the beam spot to be positioned only within a few tracks (such as between about ±5 and about ±50 tracks) of a desired target track. Consequently, a fine tracking actuator is employed to supplement the coarse carriage by finely controlling the beam spot to position and maintain it on the target track.

Because the range of motion of the fine tracking actuator is very small (less than about ±0.06 mm), the motion of the fine tracking actuator must be coordinated with that of the coarse carriage during track seeking and following operations. Moreover, the position of the beam spot due to the motion of the fine tracking actuator must be known relative to the coarse carriage. A relative position sensor associated with the fine tracking actuator generates a relative position error (RPE) signal to provide the drive controller with this necessary information.

As will be appreciated, it is desirable that the RPE signal be substantially linear over the range of interest and have a known signal-to-position slope. Many existing optical drives include physical stops which limit the range of motion of the fine tracking actuator. The RPE signal gain can be calibrated with reference to the stops such that the voltage of the RPE signal is at a known level at each of the two stops.

The fine tracking actuator of more recently developed optical drives, such as those employing galvanometer mirror fine actuators, may not include physical stops and, therefore, the RPE gain cannot be calibrated in the same manner.

SUMMARY OF THE INVENTION

In view of the foregoing, it is an object of the present invention to provide a method and apparatus for calibrating a fine tracking actuator which does not rely upon physical stops for reference points.

It is a further object to provide a method and apparatus for calibrating a fine tracking actuator which yields an RPE signal which is substantially linear and does not appreciably vary from drive to drive or actuator to actuator.

It is a still further object to provide a method and apparatus for calibrating a fine tracking actuator which yields an RPE signal which does not appreciably vary as the optical drive ages.

These and other objects are achieved in this invention by providing a method and apparatus for calibrating a relative position error signal in an optical drive when the drive is turned on and, if desired, later at periodic intervals. To perform the calibration in one embodiment, the coarse carriage is moved to a predetermined region of the optical disk and the average value of the tracking error signal measured. The fine actuator is adjusted until the tracking error signal changes by a predetermined value. Then, the relative position error signal is read and an adjustment to the RPE gain is calculated to bring the gain to a predetermined value. The adjusted gain is used during normal disk access operations.

The foregoing and other features and advantages of the invention will be apparent from the following more particular description of preferred embodiments of the invention, as illustrated in the accompanying drawings.

DETAILED DESCRIPTION OF THE INVENTION

Figure 1:
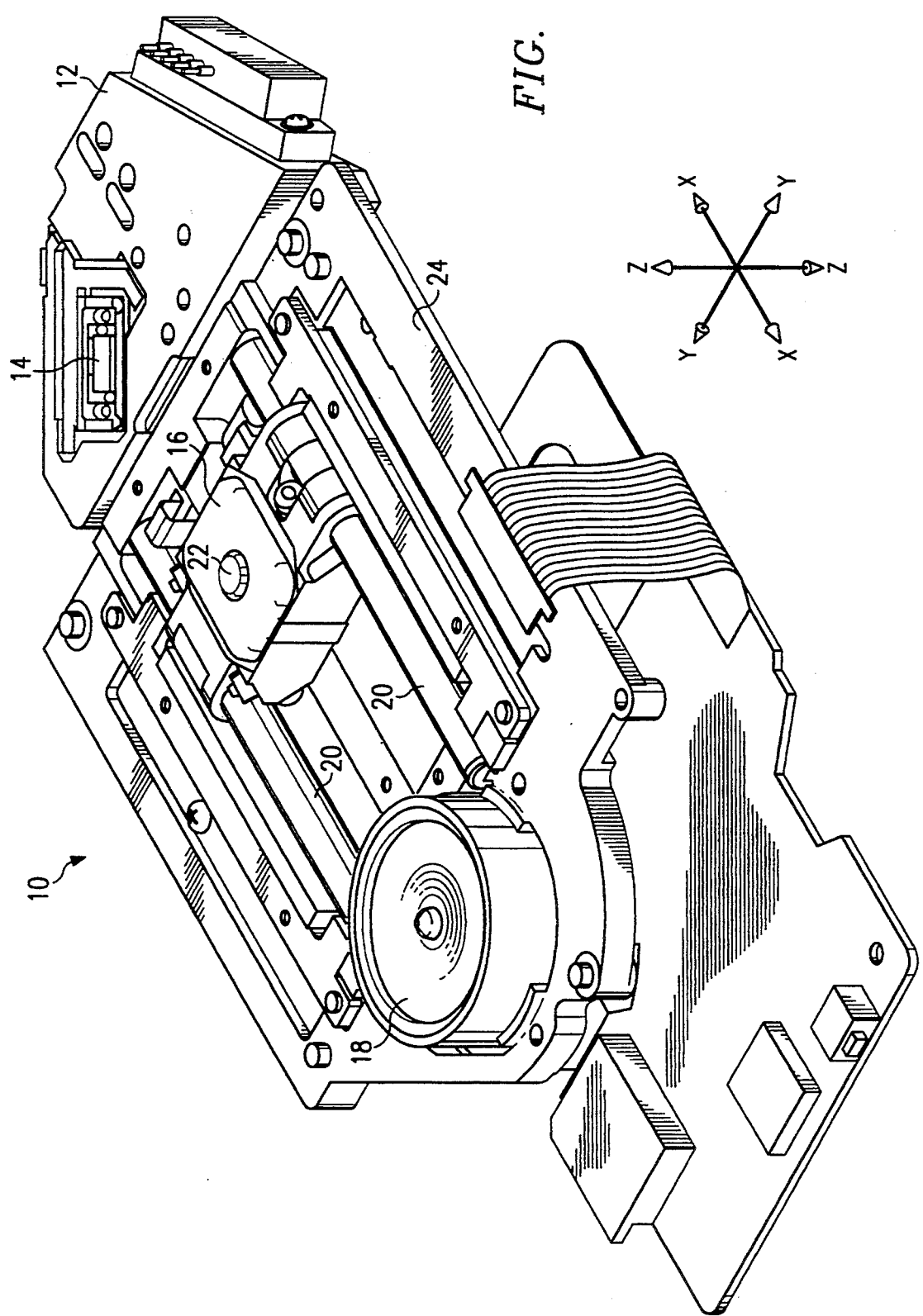
FIG. 1 is a perspective view of an optical head, fine tracking actuator, coarse carriage and spindle assembly of an optical drive of the present invention.

FIG. 1 is a perspective view of a portion of an optical disk drive assembly 10 of the present invention, including an optical head 12, a fine tracking actuator 14, a coarse carriage 16 and a spindle motor 18. A laser is mounted in the head 12 while optical elements within the head 12 and within the fine tracking actuator 14 direct the beam from the laser toward additional optical elements within the coarse carriage 16. The coarse carriage 16 travels on rails 20 parallel to an axis XX and carries an objective lens 22 and associated optical elements. An optical disk is not shown in the FIG. but would be mounted on the spindle 18. The objective lens directs laser light upwards onto an active layer on the bottom side of the disk. Proper focus of the beam spot on the disk is achieved by moving the objective lens up and down in a path parallel to an axis ZZ. In the embodiment illustrated, a base unit 24, to which the described components are mounted, enables the assembly 10 to be secured as a single unit to a loader assembly and packaged with circuit cards.

In many optical drives of past design, the fine tracking actuator is positioned on, and moves with, the coarse carriage. However, in the assembly 10 illustrated, the fine tracking actuator 14 is fixed and includes a galvanometer ("galvo") mirror which pivots a small amount on an axis parallel to the XY plane when a drive current is supplied to galvo coils.

Included in the optical head 12 is a quadrant detector positioned to receive laser light reflected off of the optical disk surface and generate a tracking error signal (TES). When the drive 10 is calibrated at the time of manufacture, the galvo mirror is placed in its rest position and the drive in its normal orientation. The relative position sensor is then adjusted until its output is zero and the alignment of the optical elements is adjusted until the tracking error signal is near zero.

Although a relationship exists between the galvo mirror tilt angle and the galvo drive current, it has been found that the relationship can vary by as much as ±20% or more between different fine actuators. A relationship also exists between the RPE value and the mirror tilt angle. However, it has been found that this relationship can vary by as much as ±50% or more between different drives. Consequently, neither of these parameters alone were chosen for RPE calibration. Instead, the TES is used as described herein.

Figure 2:
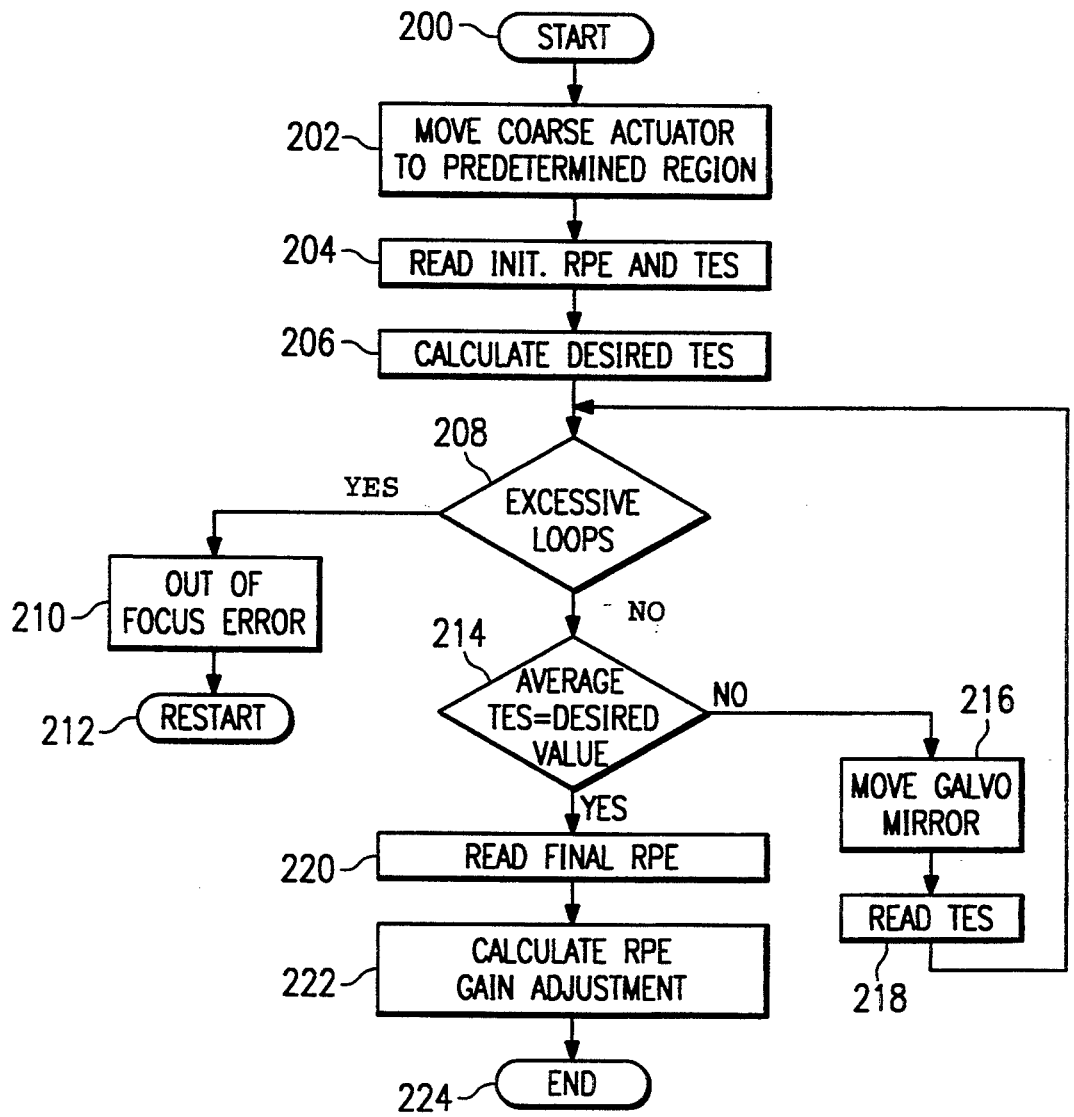
FIG. 2 is a flowchart of one embodiment of the calibration method of the present invention.

FIG. 2 is a flow chart of an embodiment of the calibration procedure of the present invention which is invoked as part of power-on routines each time the optical drive 10 is turned on by the user after factory calibration. The procedure can also be invoked periodically during use, particularly in environments in which drive shut-down may be rare. To begin (Step 200), a disk is mounted in the drive 10 and the drive controller directs the coarse carriage/actuator 16 to move to a predetermined position relative to the disk (Step 202). For example, a disk fabricated and formatted in accordance with ANSI standards will contain a mirror region near the inner diameter (ID) which is free of tracks. When the coarse carriage is positioned opposite this region, light reflected from the disk surface generates a constant amplitude (DC) TES. The mirror region is also convenient because other power-on calibrations (such as laser power calibration) are performed when the optical head is in this region. An initial average TES, which is proportional to the galvo tilt angle, and an initial RPE are read (Step 204) and a desired average TES value, which corresponds to a predetermined amount of galvo mirror tilt, is then calculated (Step 206). An error recovery procedure is included (Steps 208-212) to identify an out-of-focus condition when too many passes (such as fifty) through the loop of Steps 208 and 214-218 are performed. If the measured TES value does not equal the desired value (Step 214), the drive controller directs the fine tracking actuator to tilt the galvo mirror (Step 216). The TES is read again and these steps (Steps 208 and 214-218) are repeated until the measured TES value equals the desired value.

When the measured TES value equals the desired value, the RPE signal is read (Step 220). It is desired during normal disk access operations that, as the coarse carriage 16 moves, the tilt angle of the galvo mirror 14 remain very small (close to zero degrees relative to a normal rest angle) and that the relationship between the RPE and the galvo mirror angle be equal to a predetermined constant to reduce system variations. The ratio is employed to offset TES variations due to galvo mirror movement during, for example, seek operations to perform off-axis corrections. Therefore, the RPE gain which will satisfy these conditions is calculated (Step 222) and the adjustment to be applied to the actual measured gain is stored.

Figure 3:
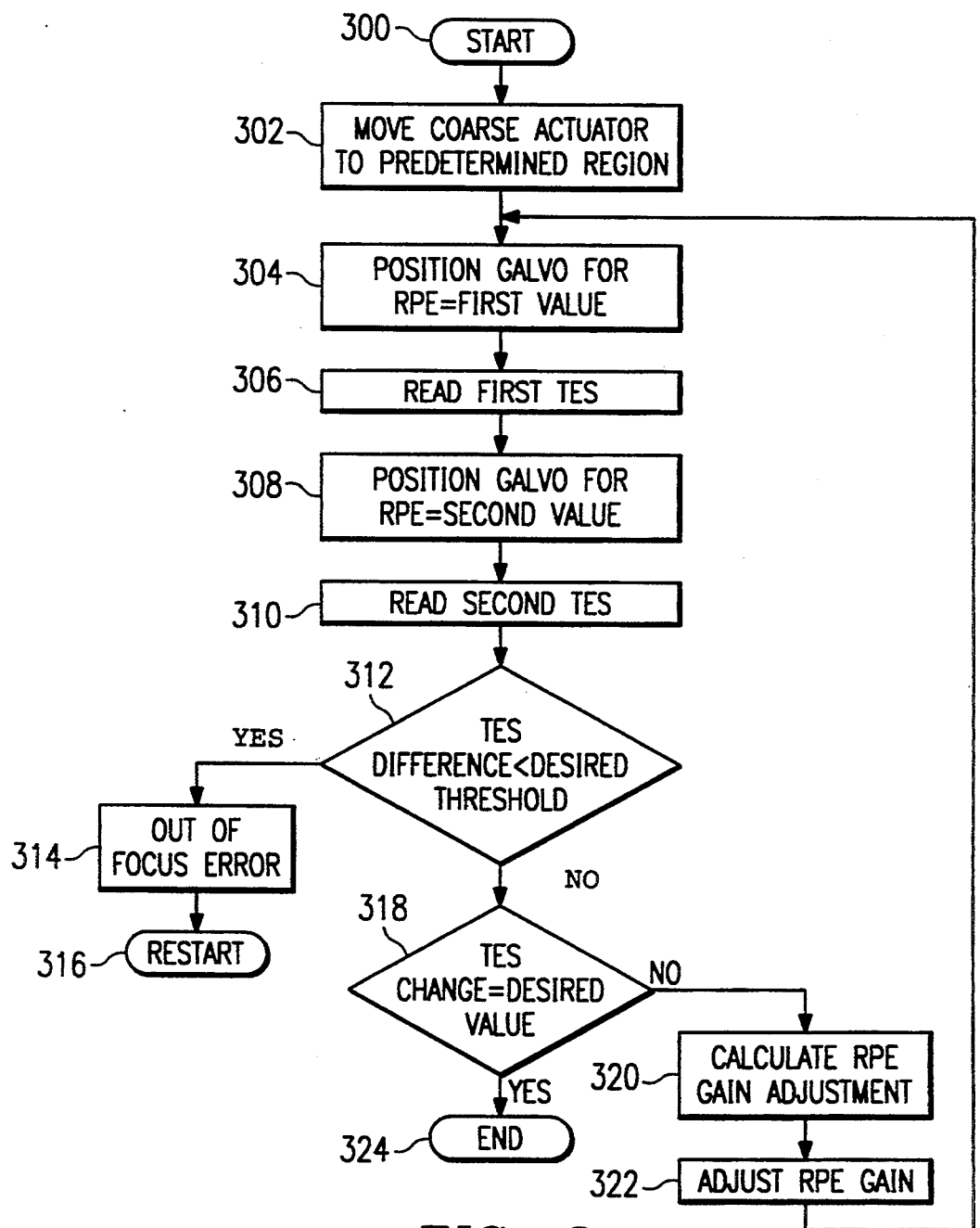
FIG. 3 is a flowchart of another embodiment of the calibration method of the present invention.

FIG. 3 is a flow chart of another embodiment of the calibration procedure of the present invention. Again, the procedure begins (Step 300) with a disk mount and the coarse actuator moving to a predetermined region (Step 302), such as the mirror region. The galvo mirror is moved until the RPE equals a first predetermined value (Step 304) and the TES is read (Step 306). The galvo mirror is moved again until the RPE equals a second predetermined value (Step 308) and the TES is again read (Step 310). If the difference between the two TES measurements is less than a desired threshold (Step 312), an out-of-focus error is indicated (Step 314) and a restart procedure must be invoked. If, on the other hand, the difference between the two TES measurements is greater than the desired threshold (Step 312), a determination is made whether the difference equals a predetermined value (Step 318). If the difference does not equal the predetermined value, an RPE gain adjustment is calculated (Step 320), the RPE gain is adjusted on the basis of the calculation (Step 322) and the procedure loops back to Step 304. When the difference in the two TES measurements equals the desired difference (Step 318), the calibration procedure is complete (Step 324).

While the invention has been particularly shown and described with reference to preferred embodiments thereof, it will be understood by those skilled in the art that various changes in form and details may be made therein without departing from the spirit and scope of the invention. For example, although the present invention has been described with specific reference to galvo mirror fine actuators, the invention is not limited to such but is equally applicable for use with any actuator, including those with physical travel stops.

What is claimed is:

1. A method of calibrating a relative position error signal in an optical storage device in which optical media is mounted, comprising the steps:
   (a) moving a coarse carriage to direct a beam of light to a predetermined region on a surface of the optical media;
   (b) measuring a first value of a tracking error signal and a first value of a relative position error signal;
   (c) calculating from the measured first values a desired value of the tracking error signal;
   (d) moving a fine actuator until the value of the tracking error signal equals the calculated desired value by:
      (d1) moving the fine actuator a predetermined amount;
      (d2) measuring a second value of the tracking error signal;
      (d3) determining whether the measured second value of the tracking error signal equals the calculated desired value;
      (d4) repeating said steps (d1) through (d3) until the measured second value of the tracking error signal equals the calculated desired value;
      (d5) determining whether said repeating step (d4) has occurred an excessive number of times; and
      (d6) if said repeating step (d4) has occurred an excessive number of times, indicating an out-of-focus error condition;
   (e) measuring the value of the relative position error signal when the value of the tracking error signal equals the calculated desired value; and
   (f) calculating an adjustment to a gain of the relative position error signal whereby the gain of the relative position error signal equals a predetermined gain.

2. A method of calibrating a relative position error signal in an optical storage device in which optical media is mounted, comprising the steps:
   (a) moving a coarse carriage to direct a beam of light to a predetermined region on a surface of the optical media;
   (b) moving a fine actuator until the value of a relative position error signal equals a first predetermined value;
   (c) measuring a first average value of a tracking error signal;
   (d) moving the fine actuator until the value of the relative position error signal equals a second predetermined value;

(e) measuring a second average value of the tracking error signal;

(f) calculating the difference between the first and second average values of the tracking error signal;

(g) determining whether the calculated difference equals a desired difference;

(h) if the calculated difference does not equal the desired difference, adjusting a gain of the relative position error signal; and (i) repeating said steps (b) through (h) until the calculated difference equals the desired difference.

3. The method of claim 2, further comprising the steps of:

determining whether said repeating step (i) has occurred an excessive number of times; and if said repeating step (i) has occurred an excessive number of times, indicating an out-of-focus error condition.

4. A optical storage device, comprising:

(a) a spindle motor for rotating an optical disk, the optical disk having a plurality of tracks between inner and outer diameters on a surface thereof;

(b) a light source for projecting a beam of light;

(c) means for moving a coarse carriage to direct a beam of light to a predetermined region on a surface of the optical media;

(d) means for moving a fine actuator until the value of a relative position error signal equals a first predetermined value;

(e) means for measuring a first average value of a tracking error signal;

(f) means for moving the fine actuator until the value of the relative position error signal equals a second predetermined value;

(g) means for measuring a second average value of the tracking error signal;

(h) means for calculating the difference between the first and second average values of the tracking error signal;

(i) means for determining whether the calculated difference equals a desired difference and, if not, adjusting a gain of the relative position error signal; and;

(i) means for repeating said steps (b) through (h) until the calculated difference equals the desired difference.

* * * * *

UNITED STATES PATENT AND TRADEMARK OFFICE
CERTIFICATE OF CORRECTION

PATENT NO. : 5,425,013
DATED : Jun. 13, 1995
INVENTOR(S) : Alan A. Fennema et al.

It is certified that error appears in the above-indentified patent and that said Letters Patent is hereby corrected as shown below:

At column 6, line 21, "(h)" should be --(i)--.

At column 6, line 21, "(i)" should be --(j)--.

Signed and Sealed this

Twelfth Day of September, 1995

Attest:

BRUCE LEHMAN

Attesting Officer     Commissioner of Patents and Trademarks